(12) United States Patent
Chen

(10) Patent No.: US 10,771,107 B2
(45) Date of Patent: Sep. 8, 2020

(54) CIRCUIT DEVICE

(71) Applicants: Inventec (Pudong) Technology Corp., Shanghai (CN); Inventec Corporation, Taipei (TW)

(72) Inventor: Yen-Hao Chen, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 3 days.

(21) Appl. No.: 16/221,596

(22) Filed: Dec. 17, 2018

(65) Prior Publication Data

US 2020/0162126 A1    May 21, 2020

(30) Foreign Application Priority Data

Nov. 16, 2018    (CN) .......................... 2018 1 1364541

(51) Int. Cl.
*H04J 3/10*     (2006.01)
*H04B 3/32*     (2006.01)
*H04B 3/487*    (2015.01)

(52) U.S. Cl.
CPC .............. *H04B 3/32* (2013.01); *H04B 3/487* (2015.01)

(58) Field of Classification Search
None
See application file for complete search history.

(56) References Cited

U.S. PATENT DOCUMENTS

| 5,475,643 | A | * | 12/1995 | Ohta | ...................... | G11C 5/063 |
| | | | | | | 365/206 |
| 2002/0051506 | A1 | * | 5/2002 | Deas | ................ | G01R 31/31725 |
| | | | | | | 375/355 |
| 2002/0066589 | A1 | * | 6/2002 | Lin | ...................... | H01B 11/005 |
| | | | | | | 174/113 R |
| 2003/0099190 | A1 | * | 5/2003 | Zerbe | ...................... | H04B 3/32 |
| | | | | | | 370/201 |
| 2009/0003464 | A1 | * | 1/2009 | Matsubara | .......... | H04L 25/0272 |
| | | | | | | 375/257 |
| 2010/0109679 | A1 | * | 5/2010 | Frech | ...................... | H04B 3/487 |
| | | | | | | 324/628 |
| 2012/0019331 | A1 | * | 1/2012 | Matsumoto | .......... | H05K 1/0231 |
| | | | | | | 333/1 |
| 2015/0130553 | A1 | * | 5/2015 | Enriquez Shibayama | .................. | |
| | | | | | | H05K 1/0228 |
| | | | | | | 333/1 |

(Continued)

*Primary Examiner* — Clemence S Han
(74) *Attorney, Agent, or Firm* — Winston Hsu

(57) ABSTRACT

A circuit device includes a positive phase signal line, a negative phase signal line and a single-ended signal line. The positive phase signal line includes a first positive-phase-signal-line terminal and a second positive-phase-signal-line terminal for transmitting a first signal. The negative phase signal line includes a first negative-phase-signal-line terminal and a second negative-phase-signal-line terminal for transmitting a second signal. The single-ended signal line is disposed between the positive phase signal line and the negative phase signal line, and includes a first single-ended signal line terminal and a second single-ended signal line terminal for transmitting a single-ended signal. The first signal of the positive phase signal line causes a first noise on the single-ended signal line. The second signal of the negative phase signal line causes a second noise on the single-ended signal line. The first noise and the second noise eliminate one another.

10 Claims, 2 Drawing Sheets

(56) References Cited

U.S. PATENT DOCUMENTS

2016/0094272 A1* 3/2016 Ye .................. H04B 3/32
  375/257
2016/0358695 A1* 12/2016 Kim ................ H04L 25/085

\* cited by examiner

CIRCUIT DEVICE

BACKGROUND OF THE INVENTION

1. Field of the Invention

The invention relate to a circuit device, and more particularly, a circuit device capable of reducing crosstalk noise and reducing a circuit size by means of a layout of signal lines.

2. Description of the Prior Art

As signal transmission speed on the circuit increases, the problem of coupling interference between signal lines increases. This sort of crosstalk interference is harmful to the correctness and completeness of the signal on the signal line. In order to reduce the influence of crosstalk interference, the distance between two signal lines can be increased to avoid the coupling effect. However, since the size of an electronic device is gradually reduced in various applications, the distance between two signal lines can hardly be increased. Therefore, how to improve the signal quality while limiting the circuit area has become an important issue.

In a circuit, a structure including two differential signal lines for transmitting a pair of differential signals and a single-ended signal line for transmitting a single-ended signal is often used. When using such a circuit structure, in practice, the two differential signal lines are often wired in parallel, and the pitch between the two differential signal lines can be a short pitch so as to strengthen the coupling effect between the two differential signal lines thereby resisting noise from the single-ended signal line.

Further, the single-ended signal line and the two differential signal lines must be separated by a long pitch to prevent the signal on the single-ended signal line and the signals on the differential signal lines from interfering with one another. The abovementioned long pitch can be twice or more times longer than the short pitch to ensure the quality of the signals. When the circuit becomes more and more complicate, the number of signal lines gradually increases. The excessive pitches among signal lines have become an unfavorable factor which enlarges the circuit area.

SUMMARY OF THE INVENTION

An embodiment provides a circuit device including a positive phase signal line, a negative phase signal line and a single-ended signal line. The positive phase signal line includes a first positive-phase-signal-line terminal and a second positive-phase-signal-line terminal and is used to transmit a first signal. The negative phase signal line includes a first negative-phase-signal-line terminal and a second negative-phase-signal-line terminal and is used to transmit a second signal. The single-ended signal line is disposed between the positive phase signal line and the negative phase signal line. The single-ended signal line includes a first single-ended signal line terminal and a second single-ended signal line terminal and is used to transmit a single-ended signal. The first signal of the positive phase signal line causes a first noise on the single-ended signal line. The second signal of the negative phase signal line causes a second noise on the single-ended signal line. The first noise and the second noise eliminate one another.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
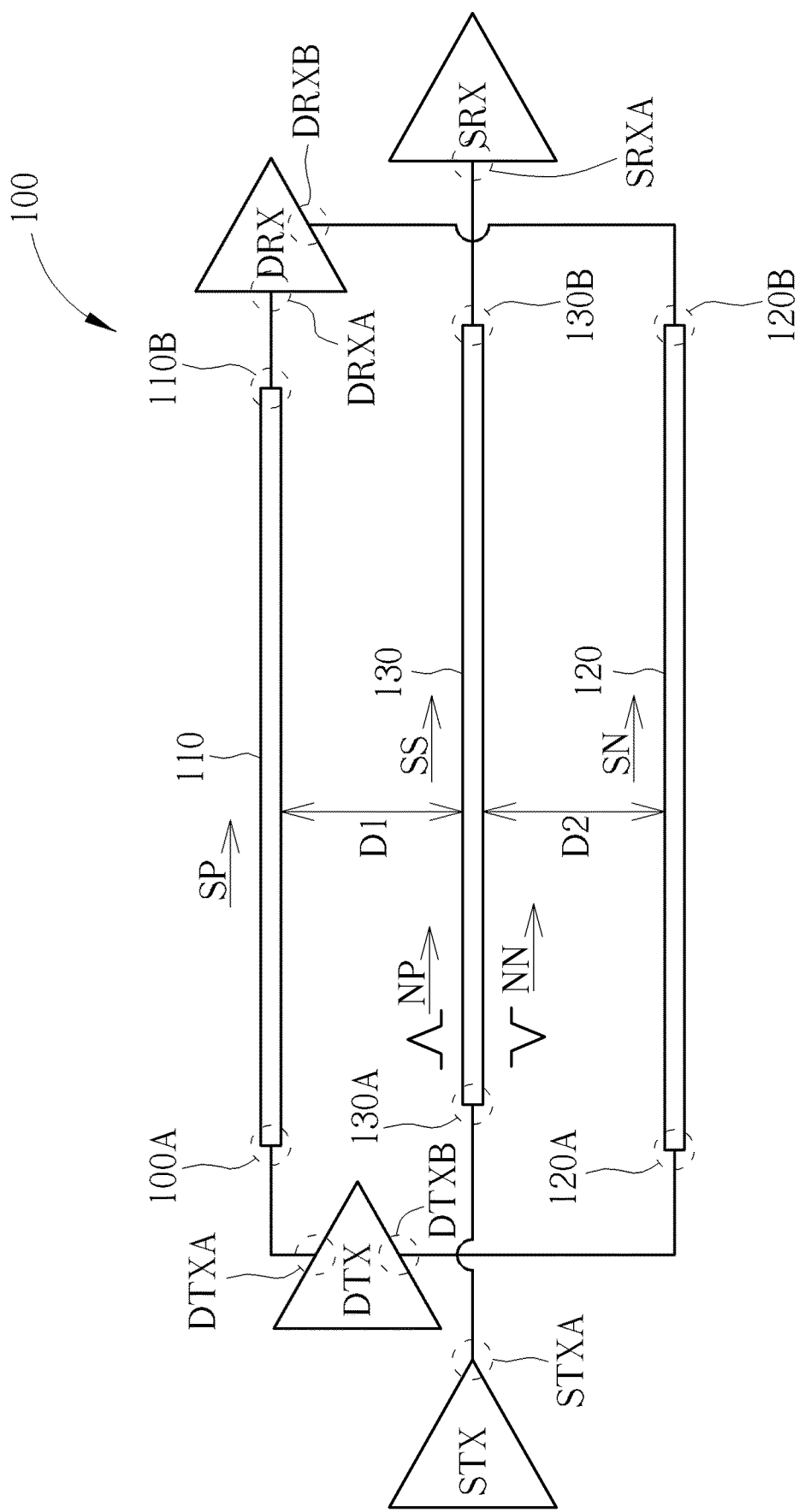
FIG. 1 illustrates a circuit device according to an embodiment.

FIG. 1 illustrates a circuit device 100 according to an embodiment. The circuit device 100 may include a positive phase signal line 110, a negative phase signal line 120 and a single-ended signal line 130 which may be formed on the same circuit layer. The positive phase signal line 110 may include a first positive-phase-signal-line terminal 110A and a second positive-phase-signal-line terminal 110B for transmitting a first signal SP. The negative phase signal line 120 may include a first negative-phase-signal-line terminal 120A and a second negative-phase-signal-line terminal 120B for transmitting a second signal SN. The single-ended signal line 130 may be disposed between the positive phase signal line 110 and the negative phase signal line 120. The single-ended signal line 130 may include a first single-ended signal line terminal 130A and a second single-ended signal line terminal 130B for transmitting a single-ended signal SS. Because of the coupling effect, the first signal SP of the positive phase signal line 110 may cause a first noise NP on the single-ended signal line 130, and the second signal SN of the negative phase signal line 120 may cause a second noise NN on the single-ended signal line 130. The first noise NP and the second noise NN may eliminate one another.

According to an embodiment, the first signal SP and the second signal SN may form a pair of differential signals. In other words, the first signal SP and the second signal SN may be in antiphase. For example, the first signal SP may have a positive phase, and the second signal SN may have a negative phase. Regarding directions of transmission of the signals, as shown in FIG. 1, the first signal SP may be transmitted from the first positive-phase-signal-line terminal 110A to the second positive-phase-signal-line terminal 110B. The second signal SN may be transmitted from the first negative-phase-signal-line terminal 120A to the second negative-phase-signal-line terminal 120B. The single-ended signal SS may be transmitted from the first single-ended signal line terminal 130A to the second single-ended signal line terminal 130B.

As shown in FIG. 1, since the first signal SP and the second signal SN may be in antiphase, the first noise NP and the second noise NN may be also in antiphase. Because the first signal SP and the second signal SN may be transmitted and received concurrently with the same transmission speed, the first noise NP and the second noise NN may cause coupling effects which are mutually contrary. Hence, the first noise NP and the second noise NN may reduce or eliminate one another.

As shown in FIG. 1, the circuit device 100 may further include a differential output unit DTX, a differential input unit DRX, a single-ended output unit STX and a single-ended input unit SRX.

The differential output unit DTX may be used to output the first signal SP and the second signal SN. The differential output unit DTX may include a first output terminal DTXA and a second output terminal DTXB. The first output terminal DTXA may be coupled to the first positive-phase-signal-line terminal 110A for outputting the first signal SP. The second output terminal STXB may be coupled to the first negative-phase-signal-line terminal 120A for outputting the second signal SN.

The differential input unit DRX may be used to receive the first signal SP and the second signal SN. The differential input unit DRX may include a first input terminal DRXA and a second input terminal DRXB. The first input terminal DRXA may be coupled to the second positive-phase-signal-line terminal 110B for receiving the first signal SP. The second input terminal DRXB may be coupled to the second negative-phase-signal-line terminal 120B for receiving the second signal SN.

The single-ended output unit STX may be used to output the single-ended signal SS. The single-ended output unit STX may include a single-ended output terminal STXA coupled to the first single-ended signal line terminal 130A.

The single-ended input unit SRX may be used to receive the single-ended signal SS. The single-ended input unit SRX may include a single-ended input terminal SRXA. The single-ended input terminal SRXA may be coupled to the second single-ended signal line terminal 130B. The first noise NP and the second noise NN may eliminate one another at the single-ended input unit SRX. In other words, by means of the layout of the signal lines provided by the embodiment of FIG. 1, the single-ended input unit SRX may receive the single-ended signal SS without being affected by the crosstalk interference caused by the differential signals (i.e. the first signal SP and the second signal SN).

As shown in FIG. 1, the positive phase signal line 110 and the single-ended signal line 130 may be separated by a first pitch D1. The negative phase signal line 120 and the single-ended signal line 130 may be separated by a second pitch D2. If the first pitch D1 and the second pitch D2 are greater, the crosstalk effects among the signal lines may be smaller. However, a smallest tolerable pitch of the first pitch D1 and the second pitch D2 may be equal to a minimum pitch of a process. The mentioned process is a process used to manufacture the circuit device 100. For example, after taking the technical limitations, the yield and the proper design margins of the process into account, and considering the design rules made with a checking program used in the front-end of circuit design, if the smallest tolerable pitch between two signal lines is n nanometers (where n is a positive integer), each of the first pitch D1 and the second pitch D2 may be designed to be n nanometers. In other words, according to embodiments, a pitch between two signal lines may be decreased to a smallest tolerable pitch, and the effect of crosstalk interference may still be eliminated. Hence, the circuit size may be prevented from being enlarged by line pitches.

In addition, according to an embodiment, the single-ended signal SS may respectively cause crosstalk interferences on the positive phase signal line 110 and the negative phase signal line 120 to affect the first signal SP of the positive phase signal line 110 and the second signal SN of the negative phase signal line 120. However, because the first signal SP and the second signal SN may be in antiphase, the interferences caused by the single-ended signal SS to the first signal SP and the second signal SN may be mutually eliminated at the differential input unit DRX. For example, at differential input unit DRX, the first signal SP and the second signal SN may be used to perform a subtraction operation to obtain information of the differential signals. By means of the subtraction operation, the crosstalk interferences caused by the single-ended signal SS to the positive phase signal line 110 and the negative phase signal line 120 may be eliminated.

Figure 2:
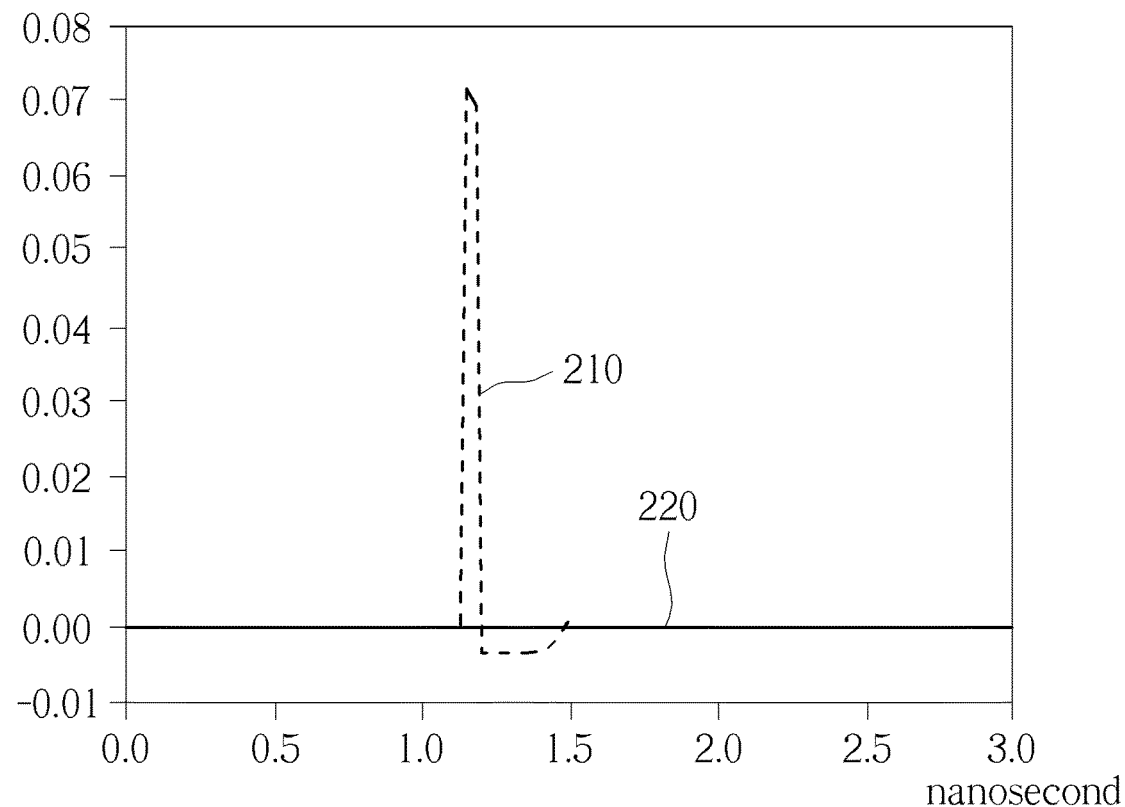
FIG. 2 illustrates a waveform of the crosstalk interference caused by the single-ended signal to the positive phase signal line and the negative phase signal line according to an embodiment.

FIG. 2 illustrates a waveform of the crosstalk interference caused by the single-ended signal SS to the positive phase signal line 110 and the negative phase signal line 120. In FIG. 2, the horizontal axis may be a time axis in nanoseconds. The vertical axis may be corresponding to normalized intensity of the crosstalk interference. The curve 210 may be corresponding to the crosstalk interference observed without the circuit device 100 provided by an embodiment. The curve 220 may be corresponding to the crosstalk interference observed with the circuit device 100 provided by an embodiment. As shown in FIG. 2, by means of the circuit device 100 provided by an embodiment, the intensity of the crosstalk interference may be decreased to almost zero.

Figure 3:
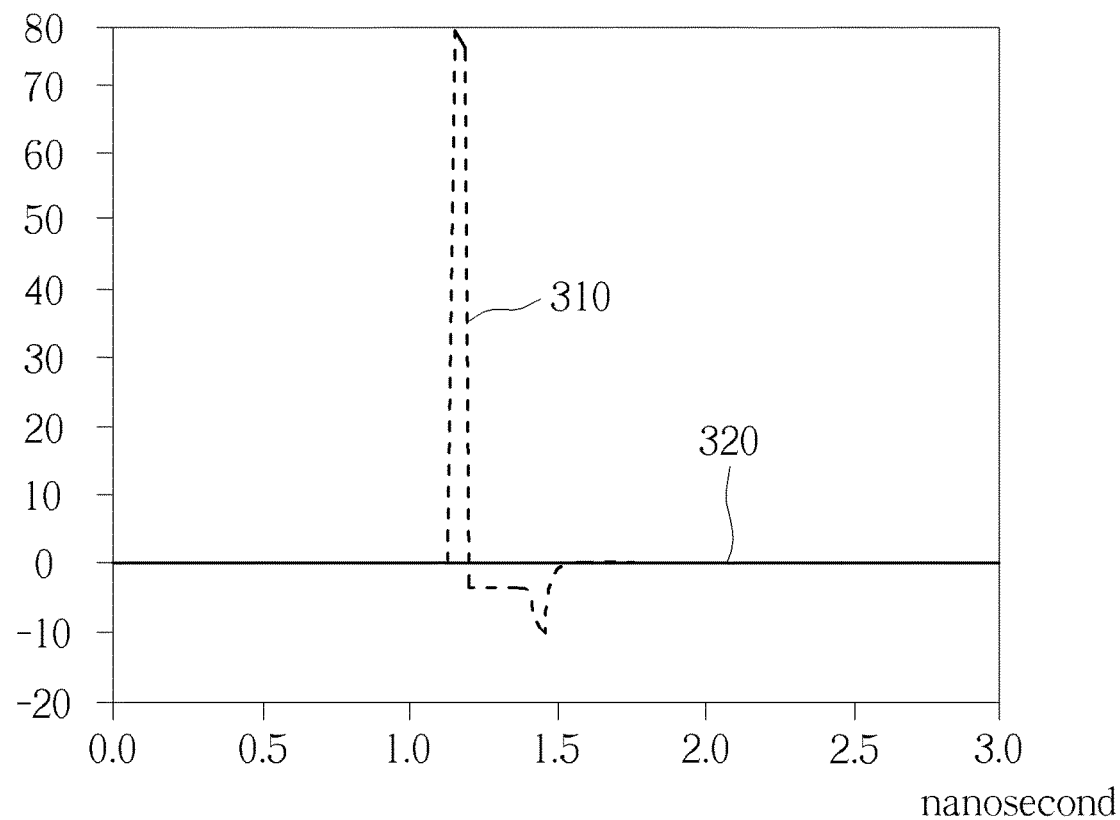
FIG. 3 illustrates a waveform of the crosstalk interference caused by the positive phase signal line and the negative phase signal line to the single-ended signal according to an embodiment.

FIG. 3 illustrates a waveform of the crosstalk interference caused by the positive phase signal line 110 and the negative phase signal line 120 to the single-ended signal SS. In FIG. 3, the horizontal axis may be a time axis in nanoseconds. The vertical axis may be corresponding to normalized intensity of the crosstalk interference. The curve 310 may be corresponding to the crosstalk interference observed without the circuit device 100 provided by an embodiment. The curve 320 may be corresponding to the crosstalk interference observed with the circuit device 100 provided by an embodiment. As shown in FIG. 3, by means of the circuit device 100 provided by an embodiment, the intensity of the crosstalk interference may be decreased to almost zero.

As shown in FIG. 2 and FIG. 2, by means of the circuit device 100 provided by an embodiment, the crosstalk interference among a pair of differential signal lines and a single-ended signal line may be effectively prevented.

In summary, by means of the circuit device 100, the problem of crosstalk interference is effectively reduced, and the pitches among signal lines are smaller. Hence, the signal quality is improved, and the circuit size is reduced. The present invention is useful for solving the engineering difficulties in the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit device comprising:
   a positive phase signal line formed on a circuit board, the positive phase signal line comprising a first positive-phase-signal-line terminal and a second positive-phase-signal-line terminal and configured to transmit a first signal;
   a negative phase signal line formed on the circuit board, the negative phase signal line comprising a first negative-phase-signal-line terminal and a second negative-phase-signal-line terminal and configured to transmit a second signal; and
   a single-ended signal line formed on the circuit board and disposed between the positive phase signal line and the negative phase signal line, the single-ended signal line comprising a first single-ended signal line terminal and a second single-ended signal line terminal and configured to transmit a single-ended signal;

wherein the first signal of the positive phase signal line causes a first noise on the single-ended signal line; the second signal of the negative phase signal line causes a second noise on the single-ended signal line; and the first noise and the second noise eliminate one another.

2. The circuit device of claim 1, wherein the first signal and the second signal form a pair of differential signals, and the first signal and the second signal are in antiphase.

3. The circuit device of claim 1, wherein the first signal is transmitted from the first positive-phase-signal-line terminal to the second positive-phase-signal-line terminal.

4. The circuit device of claim 1, wherein the second signal is transmitted from the first negative-phase-signal-line terminal to the second negative-phase-signal-line terminal.

5. The circuit device of claim 1, wherein the single-ended signal is transmitted from the first single-ended signal line terminal to the second single-ended signal line terminal.

6. The circuit device of claim 1, further comprising:
a differential output unit configured to output the first signal and the second signal, the differential output unit comprising a first output terminal and a second output terminal wherein the first output terminal is coupled to the first positive-phase-signal-line terminal and configured to output the first signal, and the second output terminal is coupled to the first negative-phase-signal-line terminal and configured to output the second signal.

7. The circuit device of claim 1, further comprising:
a differential input unit configured to receive the first signal and the second signal, the differential input unit comprising a first input terminal and a second input terminal wherein the first input terminal is coupled to the second positive-phase-signal-line terminal and configured to receive the first signal, and the second input terminal is coupled to the second negative-phase-signal-line terminal and configured to receive the second signal.

8. The circuit device of claim 1, further comprising:
a single-ended output unit configured to output the single-ended signal, the single-ended output unit comprising a single-ended output terminal coupled to the first single-ended signal line terminal.

9. The circuit device of claim 1, further comprising:
a single-ended input unit configured to receive the single-ended signal, the single-ended input unit comprising a single-ended input terminal coupled to the second single-ended signal line terminal;
wherein the first noise and the second noise eliminate one another at the single-ended input unit.

10. The circuit device of claim 1, wherein the circuit device is manufactured with a process, the positive phase signal line and the single-ended signal line are separated by a first pitch, the negative phase signal line and the single-ended signal line are separated by a second pitch, a minimum pitch of the process is equal to or smaller than each of the first pitch and the second pitch.

* * * * *